United States Patent Office 3,416,634
Patented Dec. 17, 1968

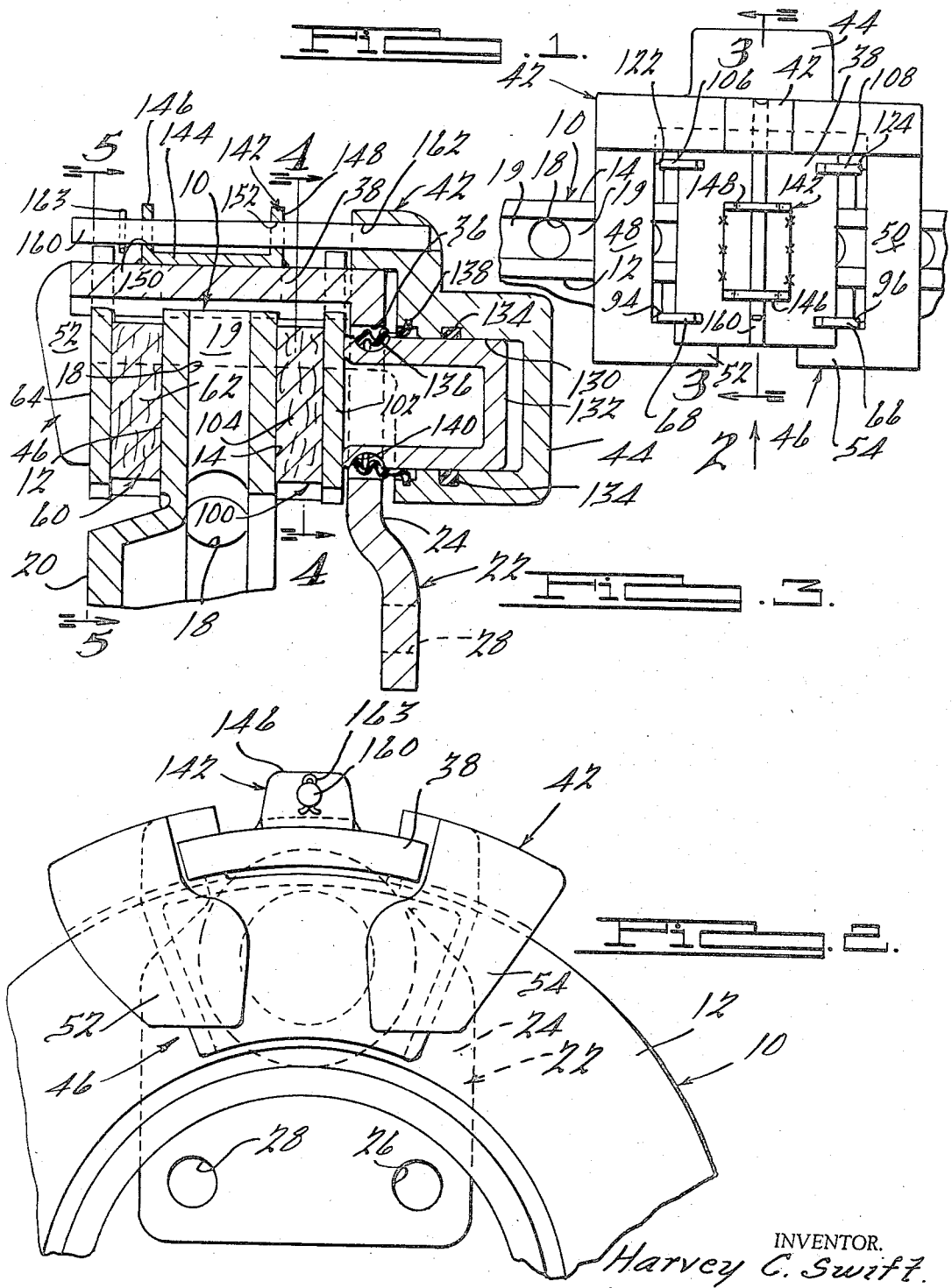

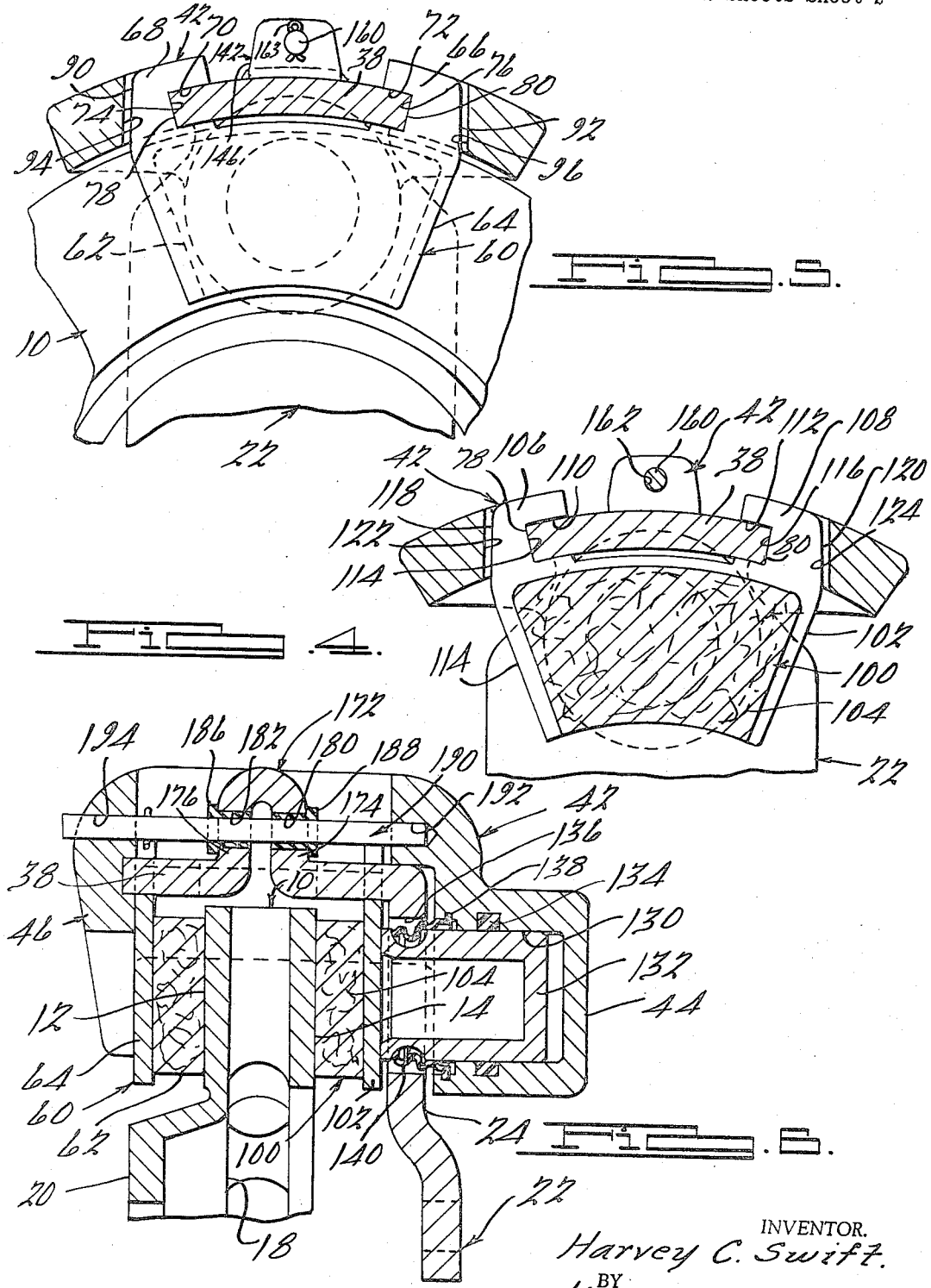

1

3,416,634
CALIPER-TYPE DISK BRAKE AND SUPPORT
MEANS THEREFOR
Harvey C. Swift, Birmingham, Mich., assignor to Kelsey-Hayes Company, Romulus, Mich., a corporation of Delaware
Filed Aug. 18, 1967, Ser. No. 661,621
5 Claims. (Cl. 188—73)

ABSTRACT OF THE DISCLOSURE

A disk brake of the floating caliper type in which the torque reaction on the brake pads is taken by a portion of a torque plate that extends across the outer periphery of the brake disk. The caliper assembly is slidably supported on the portion of the torque plate adjacent the periphery of the disk by means of a pin that extends in the direction of sliding movement.

Background of the invention

This invention relates to an improved disk brake assembly and more particularly to an improved arrangement for transmitting the braking torque from the disk to a stationary torque plate.

The sliding caliper type of disk brake assembly is generally well known. In this type of assembly one of the brake pads is brought into engagement with one face of the brake disk by a hydraulic piston and the other brake pad is brought into engagement with its respective side of the disk by a reaction force that is transmitted through a caliper assembly that straddles the disk. In this type of brake assembly it is important that the brake pads be brought into full face contact with the respective braking surfaces of the disk and that a substantially rigid member takes the braking torque.

It is, therefore, a principal object of this invention to provide an improved disk brake assembly.

It is another object of this invention to provide a disk brake assembly wherein the braking torque is taken at the periphery of the brake disk.

It is a further object of this invention to provide an improved supporting arrangement for the caliper assembly of a disk brake.

Summary of the invention

A disk brake embodying this invention is particularly adapted to brake a rotary disk having oppositely facing braking surfaces. The brake assembly comprises a caliper that is adapted to straddle the disk and which has first and second spaced portions adapted to be positioned contiguous to respective ones of the braking surfaces. The caliper assembly is associated with a torque plate that has a first portion juxtaposed to the first portion of the caliper assembly and which is adapted to be fixed relative to the disk. A second portion of the torque plate extends from the first portion between the caliper portions and across the peripheral edges of the disk. First and second brake pads are associated, respectively, with the first and seconds portions of the caliper assembly. Actuating means are carried by the caliper assembly for bringing the brake pads into frictional engagement with the respective braking surfaces of the brake disk. Means are provided for transmitting the braking torque reaction from the brake pads to the second portion of the torque plate contiguous to the periphery of the disk.

Brief description of the drawings

FIGURE 1 is a top elevational view of the disk brake of the present invention.

2

FIGURE 2 is an end elevational view taken in the direction of the arrow 2 shown in FIGURE 1.

FIGURE 3 is a cross-sectional view taken along the lines 3—3 of FIGURE 1.

FIGURE 4 is a sectional view taken along the lines 4—4 of FIGURE 3.

FIGURE 5 is a sectional view taken along the lines 5—5 of FIGURE 3.

FIGURE 6 is a cross-sectional view, in part similar to FIGURE 3, showing another embodiment of the present invention.

Detailed description of the preferred embodiments

Referring first to the embodiment shown in FIGURES 1 through 5, there is illustrated an automotive disk brake assembly including a rotatable disk 10 having a first radially extending braking surface 12 and an oppositely facing second braking surface 14. The brake disk 10 may be of any known construction and is illustrated as being of the ventilated type with radially extending ventilating slots 18 defined by circumferentially spaced radially extending spacer members 19 that connect the surfaces 12 and 14. An attaching flange 20 is formed integrally with the braking disk 10 and extends in a direction generally parallel to the braking surfaces 12 and 14 and radially inwardly therefrom. This attaching flange 20 is adapted to be fixed to a rotatable portion of an associated vehicular wheel and, therefore, rotates with the wheel.

A stationary torque plate 22 having a first portion 24 extending in a plane generally parallel to the plane of rotation of the disk 10 is adapted to be fixedly mounted on a fixed portion of the associated vehicle as is conventional in disk brake assemblies. For this purpose a pair of apertures 26 and 28 are formed adjacent the inner edge of the portion 24 to receive attachment members such as bolts (not shown) to affix the stationary torque plate against rotation relative to a stationary portion of the vehicle. The portion 24 of the stationary torque plate 22 is formed with a circular aperture 36 positioned therein for purposes which will be described subsequently. Adjacent the upper edge of the aperture 36, a second portion 38 extends integrally from the portion 24 and in a direction generally perpendicular to the first portion 24. This second portion 38 is generally arcuate in configuration and is positioned radially outwardly of the outer periphery of the disk 10. The portion 38 curves about a center that is substantially concentric with the axis of rotation of the disk 10.

A caliper 42 straddles the disk 10 adjacent the torque plate 22. The caliper 42 is comprised of a fluid motor portion 44 and a reaction portion 46 with intermediate interconnecting arms 48 and 50 connecting the portions 44 and 46 on opposite sides of the torque plate portion 38. The reaction portion 46 is provided by inwardly extending flanges 52 and 54 that are formed integrally with the arms 48 and 50.

As can best be seen by reference to FIGURES 3 and 5, a first brake pad 60, having a brake lining 62 and a backing plate 64, is associated with the caliper reaction portion 46. The backing plate 64 has a pair of upstanding ears 66 and 68 each having slots 70 and 72 (FIGURE 5) positioned therein, respectively, for the reception of the second portion 38 of the stationary torque plate 22. Each of these slots 70 and 72 have spaced oppositely facing shoulders 74 and 76 that are engaged with spaced shoulders 78 and 80 formed on the perpendicularly extending portion 38 of the stationary torque plate 22 for a purpose which will become more apparent as this description proceeds. The backing plate 64 of the brake pad 60 also has outer shoulders 90 and 92 that are spaced inwardly from spaced shoulders 94 and 96 formed by the arms 48 and 50 of the caliper 36.

Similarly, there is provided (FIGURE 4) a second brake pad 100 associated with the caliper fluid motor portion 44 having a backing plate 102 and a brake lining 104. The backing plate 102 has upstanding ears 106 and 108, respectively, formed with slots 110 and 112 that define spaced oppositely facing shoulders 114 and 116, respectively. The shoulders are adapted to react against the shoulders 78 and 80 of the portion 38 of the stationary torque plate 22. The backing plate 102 also has outwardly extending shoulders 118 and 120 formed thereon that are spaced inwardly from spaced shoulders 122 and 124, respectively, formed by arms 48 and 50 adjacent the fluid motor portion 44 of the caliper 42.

It can readily be appreciated by an inspection of FIGURES 4 and 5 that the braking torque which is applied to the brake pads 60 and 100 as the brakes are applied is transferred through the above-described construction to the centrally located generally perpendicularly extending portion 38 of the stationary torque plate 22 as the brake pads 60 and 100 are brought into engagement with the braking surfaces 12 and 14 of the rotatable disk 10.

The fluid motor portion 44 of the caliper 42 has a centrally located bore 130 formed therein that receives a slidable piston 132 that is sealed with respect to the cylindrical bore 130 by means of a conventional seal 134. The outer end of the piston 132 extends through the torque plate aperture 36 and bears against the backing plate 102 of the brake pad 100. A sealing boot 136 has one end thereof 138 positioned in engagement with the fluid motor portion 44 of the caliper 42 around the bore 130 and the other end thereof 140 positioned in engagement with the slidable piston 132.

The second portion 38 of the stationary torque plate 22 that extends in a direction generally perpendicular to the plane of rotation of the disk 10 to be braked has a U-shaped member 142 affixed thereto that has a first generally circumferentially shaped portion 144 affixed to this generally perpendicularly extending portion 38 of the torque plate by welding or by any other suitable means. This portion 144 has outwardly extending ears 146 and 148 formed integrally therewith, each of which has a respective centrally located aperture 150 and 152 for the reception of a pin 160. This pin extends in a direction generally parallel to the section 38 of the torque plate 22 and it has an end portion that extends into a bore 162 formed in the fluid motor portion 44 of the caliper 42 and may be held therein as by a press fit. A metallic gripping means in the form of a cotter key 163 engages the pin 160 and faces the ear 146 of the U-shaped member 142 to limit movement of the pin 160 to the right as viewed in FIGURE 3.

When fluid under pressure is admitted behind the piston 132, as shown in FIGURE 3, from any suitable pressure source such as a master cylinder (not shown), the piston 132 is moved to the left thereby moving the brake pad 100 to the left and bringing the brake lining 104 of the brake shoe 100 into frictional engagement with the braking surface 14. The reaction of this fluid against the fluid motor portion 44 of the caliper 42 shifts the caliper 42 to the right, as viewed in FIGURE 3, and brings the brake lining 62 of the brake pad 60 into frictional engagement with the braking surface 12 of the rotor 10. This shifting of the caliper 42 with respect to the torque plate is permitted by sliding movement of the caliper 42 upon the pin 160 that is received in the bore 162 of the fluid motor portion 44 of the caliper 42. The torque reaction applied to the brake pad 60 will be taken by the surfaces 76 or 74 of the torque plate portion 38 depending upon the direction of rotation. In a like manner, the torque reaction upon the brake pad 100 is taken by the surfaces 116 or 114 of the torque plate portion 38 depending upon the direction of rotation.

In the described embodiment, the caliper 42 was supported for transverse movement relative to the torque plate by the member 142 which was attached to the torque plate portion 38. Another embodiment of the invention is shown in FIGURE 6. The embodiment shown in FIGURE 6 is similar in many respects to the previously described embodiment and components which are substantially the same as those in the embodiment previously described have been identified by the same reference numerals and will not be described again in detail. In the embodiment of FIGURE 6, the use of a separate member for supporting the pin has been obviated through a specially formed torque plate. More particularly, the portion of the torque plate that extends radially with respect to the brake disk 10 is formed so as to directly support the pin.

Referring now specifically to the embodiment of the invention shown in FIGURE 6, the second portion 38 of the torque plate 22 extends in a direction generally perpendicularly to the plane of rotation of the disk to be braked. The portion 38 is formed with an integral U-shaped portion 172 having opposed legs 174 and 176 which lie adjacent the outer periphery of the disk 10. The leg 174 has a centrally extending aperture 180 positioned in opposed relationship to a centrally extending aperture 182 in the leg 176. Each of the apertures 180 and 182 contain grommets 186 and 188 that resiliently grip a pin 190 that has one end press fitted in a bore 192 in the fluid motor portion 44 of the caliper, and another end extending through a bore 194 in the reaction portion 46 of the caliper.

The braking action of this embodiment of the invention is similar to the braking action described in the embodiments of FIGURES 1 through 5 in that fluid under pressure is admitted behind the piston 132 thereby moving it to the left and causing the brake lining 104 to come into engagement with the braking surface 14 on the disk 10. This action shifts the caliper to the right, as shown in FIGURE 6, and brings the brake lining 62 of the brake pad 60 into engagement with the braking surface 12 on the disk 10 through the action of the inwardly extending ears 52 and 54 positioned on the caliper.

As in the previously described embodiment, the torque reactions are transferred from the brake pads 60 and 100 to the torque plate portion 38. The pin 190 supports the caliper 42 for sliding movement in a radial direction with respect to the disk 10.

It can be readily appreciated in examination of the specification and by an examination of the drawings, that the movement of the caliper 42 relative to the section 38 of the torque plate is permitted by the action of the pin 160, as shown in FIGURE 3, and by the action of the pin 190 as shown in FIGURE 6. These pins permit the caliper 42 in each embodiment to slide in a direction generally perpendicular to the plane of rotation of the disk 10 and they permit the brake linings 62 and 104 of the brake pads 60 and 100 to be brought into proper engagement with the braking surfaces 12 and 14 of the rotatable disk 10. It can be readily appreciated, therefore, that the present invention provides a disk brake that is uncomplicated, economical and uses a minimum of parts.

While it will be apparent that the embodiments of the invention herein disclosed are well calculated to fulfill the objects above stated, it will be appreciated that the invention is susceptible to modification, variation and change.

What is claimed is:

1. In a disk brake for braking a rotary disk, a caliper adapted to straddle the disk and having an actuating portion adapted to be positioned on one side of the disk, a reaction portion adapted to be positioned on the other side of the disk and an intermediate portion connecting said actuating portion to said reaction portion, a fixed torque plate having a first portion extending in a direction generally parallel to the plane of rotation of the disk and a second portion joined to said first portion and extending generally perpendicular to said first portion, said intermediate portion of said caliper defining a central opening extending from one side of the disk to the other side of the disk, said second portion of said torque plate being positioned contiguous to said opening and being adapted to be positioned radially outwardly of the periphery of said disk, caliper supporting means carried by said second portion of said torque plate for slidably mounting said caliper on said torque plate in a direction generally perpendicular to the plane of rotation of the disk, a first brake pad positioned adjacent said actuating portion of said caliper and adapted to be actuated thereby, a second brake pad positioned adjacent said reaction portion of said caliper and adapted to be actuated thereby, actuating means carried by said actuating portion of said caliper for urging said first brake pad into engagement with the associated disk and for sliding said caliper relative to said second portion of said torque plate for urging said second brake pad into engagement with said disk by said reaction portion of said caliper, and means on each of said brake pads engageable with said second portion of said torque plate for transmitting braking torque from said brake pads to said second portion of said torque plate.

2. A disk brake as set forth in claim 1 wherein each of said brake pads comprises a frictional lining and a backing plate, the means on each of said brake pads engageable with the second portion of the torque plate comprising slotted portions formed in each of said backing plates through which said second portion of said torque plate extends.

3. A disk brake as set forth in claim 1 wherein the caliper supporting means comprises means fixed relative to the second portion of the torque plate defining a pair of spaced apertures, said apertures being aligned in a direction parallel to the axis of rotation of the disk, and pin means fixed to said caliper and extending through said apertures.

4. A disk brake as set forth in claim 3 wherein the apertures are formed integrally with the second portion of the torque plate.

5. A disk brake as set forth in claim 3 wherein each of said brake pads comprises a frictional lining and a backing plate, the means on each of said brake pads engageable with the second portion of the torque plate comprising slotted portions formed in each of said backing plates through which said second portion of said torque plate extends.

References Cited
UNITED STATES PATENTS

| | | | |
|---|---|---|---|
| 3,194,351 | 7/1965 | Swift | 188—73 |
| 3,260,332 | 7/1966 | Wells | 188—73 |
| 3,261,430 | 7/1966 | Wilson et al. | 188—73 |
| 3,269,490 | 8/1966 | Swift | 188—73 |

GEORGE E. A. HALVOSA, *Primary Examiner.*